United States Patent

[11] 3,578,046

[72] Inventor Joseph W. Curran
 22 St. Mary's Place, Denville, N.J. 07834
[21] Appl. No. 785,528
[22] Filed Dec. 20, 1968
[45] Patented May 11, 1971

[54] TOOL
4 Claims, 4 Drawing Figs.
[52] U.S. Cl.................................................... 145/50,
 81/90
[51] Int. Cl....................................................... B25b 15/00
[50] Field of Search............................................ 145/50(-1),
 50; 81/3(-02), 90(-1), 90(-4), 90(-5); 85/45

[56] References Cited
UNITED STATES PATENTS
1,000,280 8/1911 Messenger..................... 145/50
1,745,310 1/1930 Novick.......................... 81/90
2,619,861 12/1952 Wanamaker.................. 81/90
FOREIGN PATENTS
195,189 1/1958 Germany...................... 145/50(-1)

Primary Examiner—Lester M. Swingle
Assistant Examiner—Roscoe V. Parker, Jr.
Attorney—Bernard J. Murphy ABSTRACT: A bifurcated screwdriver for torquing a threaded fastener having a drive slot interrupted by a borehole. The tines for torquing the fastener have a first pair of linear thrust surfaces and a second pair of nonlinear thrust surfaces along the termination thereof, together with two pair of torquing surfaces adjacent thereto. In addition, the tines have axially-extending, arcuate surfaces for position-orienting the tool relative to the borehole upon the borehole having an element in penetration thereof. The tool has a hexagonal shank for engagement with a mechanically-advantaged torquing source.

PATENTED MAY 11 1971 3,578,046
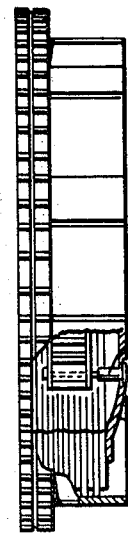
FIG. 1
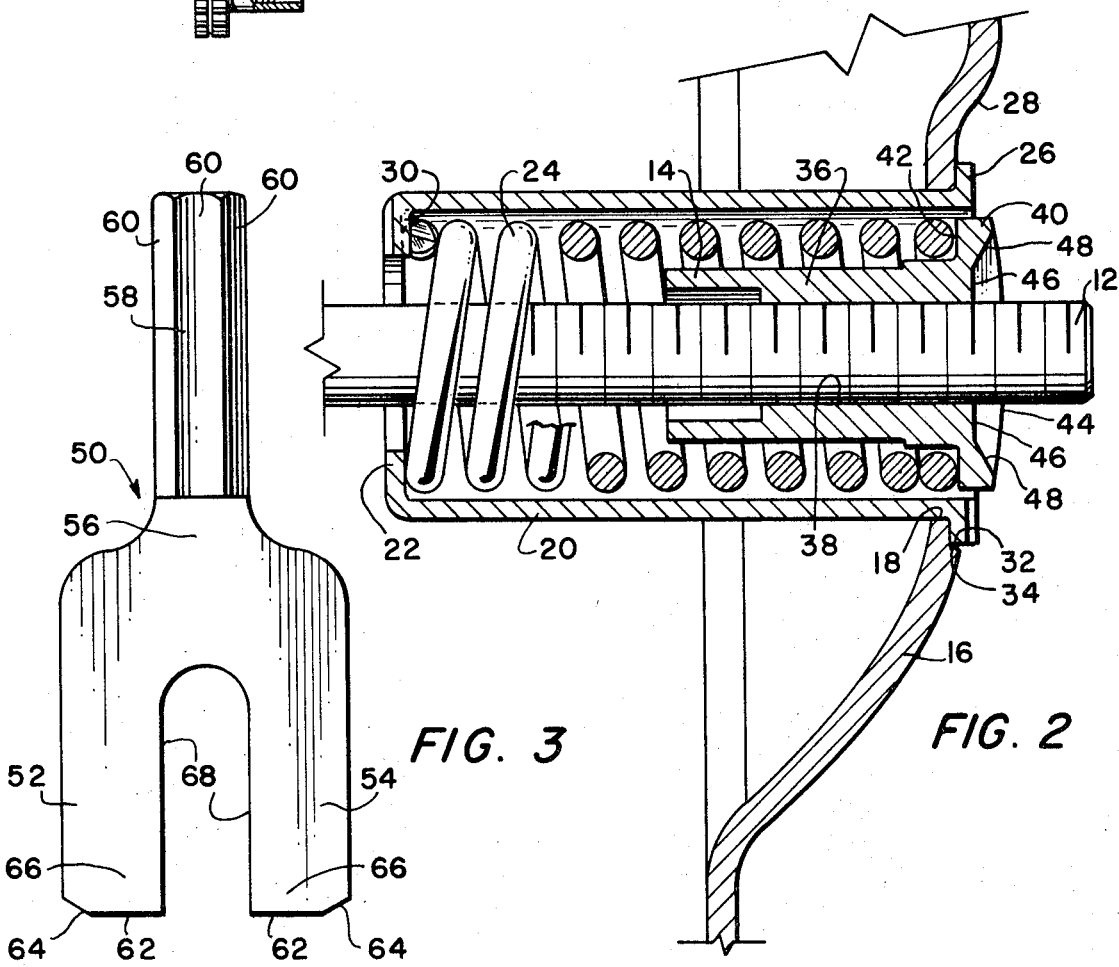
FIG. 3 FIG. 2
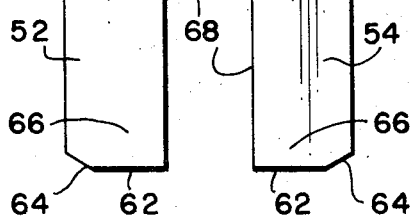
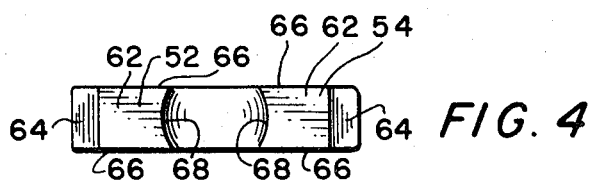
FIG. 4
INVENTOR.
JOSEPH W. CURRAN
BY
Bernard J. Murphy
AGENT

TOOL

This invention pertains to tools for torquing a threaded fastener, and in particular to a bifurcated tool, such as a screwdriver, for torquing a threaded fastener having a drive slot interrupted by a borehole which borehole is penetratable by a further member.

Bifurcated torquing tools, especially bifurcated screwdrivers, are known in the prior art. These known tools have one plurality of linear, fastener-engaging surfaces for imparting thrust to the two sections of the slot of the fastener, and adjacent surfaces for torquing the upstanding walls of the slot.

The known bifurcated torquing tools are somewhat limited in that they are not universally applicable, with full efficiency, to use with any and all fasteners.

Threaded fasteners having a drive slot interrupted by a borehole, for penetration by a further member, commonly have both linear surfaces in the slot for receiving thrust from the tool, and nonlinear surfaces immediately adjacent thereto. By way of explanation: by linear and nonlinear, with respect to a fasteners' slot surfaces of the tool's tine surfaces, I mean first surfaces, interrupted for accommodating a penetrating member, which extend along a first, common plane transverse to the axis of the fastener or tool, and second surfaces, contiguous with the first surfaces, each of which extends along independent planes, transverse to the axis of the fastener or tool, in which the second surfaces share no common transverse plane. In that the first surfaces share a common plane, I refer to them as "linear"; in that the second surfaces share no common plane, I refer to them as "nonlinear."

Now then, threaded fasteners commonly having both linear slot surfaces, and nonlinear slot surfaces immediately adjacent thereto, have the latter surfaces formed angularly from the linear surfaces so as to provide a circumferential wall for the head of the fastener which is not severed, and accordingly weakened, by the slotting. The known tools engage the linear surfaces of the slot, but are without means for employing the surfaces of the slot adjacent thereto—the nonlinear surfaces—for adding thrust to the work. This lack is also manifest in the inability of the known tools to engage the upstanding walls of the nonlinear slot surfaces to impart added torque to the work.

When a bifurcated tool having tines which dimensionally and configuratively correspond with only the linear slot surfaces of a fastener is addressed to the fastener for the torquing thereof, the just-noted opportunities for adding thrust and torque energy are lost.

Frequently a mismatched bifurcated tool will be deployed in the work. That is, where the gross overall length of the linear surfaces of the fastener slot is of a dimension of X, a tool having slot-engaging surfaces of an overall length of X plus Y will be jammed into the fastener head. The purpose here is to derive engagement with more of the slot surfaces. However, the result of this is to damage the nonlinear slot surfaces of the fastener, or damage the walls about the circumference of the head of the fastener. So also, this mismatch makes it impossible for the driving surfaces of the tines of the tool to bottom in the linear slot surfaces, whereby both thrust and torque power are frustrated.

In the prior art the known bifurcated tools used for torquing slotted fasteners fail to take advantage of surfaces which could inhere in the tool for position-orienting the tool relative to the fastener. These tools have relieved areas between the tines to accommodate for the penetration of an element through the borehole of the fastener, but they rely upon a hoped-for correspondence of the tines drive surfaces with slot surfaces for proper orientation of the tool.

It is an object of this invention, then, to provide a tool for torquing a threaded fastener having a drive slot interrupted by a borehole, said slot having a plurality of thrust-receiving bearing surfaces, the tool comprising pluralities of means for matingly engaging the bearing surfaces, shank means for receiving torque and for imparting same to said pluralities, and means unitizingly coupling said shank means and said pluralities.

It is another object of this invention to provision a tool of the type noted which has surfaces for position-orienting said tool relative to the threaded fastener.

It is another object of this invention to provision a tool of the type noted which has means for coupling engagement with a mechanically-advantaged torque source.

A feature of this invention comprises a bifurcated screwdriver-type tool having a plurality of tines for engaging a threaded fastener having a drive slot interrupted by a borehole. The tines have a first pair of linear thrust surfaces and a second pair of nonlinear thrust surfaces for engagement with the drive slot.

Another feature of this invention comprises a bifurcated screwdriver-type tool having axially extending surfaces for position-orienting the tool relative to the fastener on which it is used, upon said fastener having a member in penetration of a borehole formed therein.

Further objects and features of this invention will become more apparent by reference to the following description taken in conjunction with the accompanying FIGS. in which:

FIG. 1 is a side elevational view, partly in cross section, of an apparatus, such as a clutch, having a threaded fastener with an interrupted drive slot and a borehole formed therein in use therewith;

FIG. 2 is an enlarged side elevational view of the threaded fastener of FIG. 1, together with associated parts as used in the apparatus of FIG. 1, substantially in axially extending cross section;

FIG. 3 is a vertical elevational view of the tool according to the invention, usable on the fastener of FIGS. 1 and 2; and FIG. 4 is a bottom view of the tool of FIG. 3.

As shown in FIG. 1, apparatus 10 commonly have fasteners, such as screw 12, in penetration thereof for purposes of assembled retention of the components of the apparatus, which further penetrate a threaded fastener 14 with which they are securely engaged.

Apparatus 10 represents a frictionplate-type clutch, by way of example, having friction and pressure plates in juxtaposition biasingly constrained together by means of screw 12 and fastener 14, relative to a cover plate 16.

As shown in FIG. 2, cover plate 16 has an aperture 18 formed therein for receiving a spring sleeve 20. Sleeve 20 has an inwardly-extending lip 22 thereupon to receive one end of a compression spring 24. Lip 22 is formed at one end of sleeve 20, and the other end of sleeve 20 has an outwardly-extending lip 26 for engaging the outer surface 28 of plate 16.

Lip 22 has a staking prominence 30 rising from the spring-engaging surface of the lip. Prominence 30 is provisioned to receive thereagainst one end of the spring helix to constrain the spring 24 against rotation.

Plate 16 has a staking slot 32 formed in the periphery of aperture 18 for receiving a staking prominence 34 rising from and formed in the plate-engaging surface of lip 26. Prominence 34 and slot 32 are provisioned to restrain sleeve 20 against rotation.

The fastener 14 has an elongated shaft 36 which is disposed centrally of said spring 24 and which is internally bored and threaded, at 38, to receive screw 12 fastenly therein.

Fastener 14 terminates at one end in a drive head 40 of extended diameter. Head 40 has substantially parallel surfaces to either sides thereof. One surface 42 faces and receives thereagainst the other end of the spring helix. The other surface 44 has a first pair of linear slot surfaces 46 and a second pair of nonlinear slot surfaces 48.

The tool 50, according to the invention, as shown in FIGS. 3 and 4, has a plurality of tines 52 and 54 which extend from a common yoke 56; the yoke 56 terminates in a shank 58.

Shank 58 has flatted surfaces 60, extending along the axis of tool 50, which define a hexagonal cross section. Hexagonal shank 58 is provided for socketed engagement with a brace-type torquing driver, or with a powered tool, for deriving mechanically-advantaged torque from such driver or powered tool, more facilely to turn fastener 14.

It is to be noted, with particular reference to FIG. 2, that it is only through the influence of overriding torque that fastener 14 can be turned off screw 12. On turning and thrusting against fastener 14, spring 24 is urged forcefully against prominence 30. All the while spring 24 is thrusting against surface 42 of fastener 14 which has the effect of "fighting" or resisting the tendency of fastener 14 to turn. The use of a bifurcated screwdriver having a handgrip on a shank thereof is virtually ineffective toward freeing fastener 14. Such a tool cannot develop sufficient torque, unless perhaps the handgrip is clasped with both hands, to overcome all the forces resisting the reverse torquing of fastener 14.

Priorly it had been the practice to use a tool having tines which will engage surfaces 46 to turn fastener 14. But this practice neglects to benefit from the available torquing surface offered by surfaces 48. However, until my teaching, such tools have only had tine terminating thrust-imparting surfaces dimensionally and configuratively in correspondence with such surfaces as surfaces 46.

To derive further thrust-receiving surface, it has been known in the prior art to use a mismatched tool with tines terminating in thrust-imparting surfaces of greater length than those offered by surfaces such as surfaces 46. In this practice, either the adjacent surfaces, such as surfaces 48, are disrupted and previously damaged, or the peripheral wall of the head 40 is broken through. In the rupture of the wall of the head 40, the fastener 14 is weakened. In disruptingly impinging upon surfaces, such as surfaces 48, the thrust-engaging surfaces of the tines thereof are spacially removed from surfaces 46. They cannot bottom therein, except by seriously penetrating surfaces 48. If removed from surfaces 46, in failing to bottom therein, then the lateral surfaces of the tines make a lesser-area engagement with the walls of the slotting of surface 44. Accordingly, much of the torquing force cannot be applied to the fastener 14. The tines have but a shallow intrusion into the slotting.

My tool 50 is novelly configured to insure a full intrusive penetration of the tines 52 and 54 into the slotting of fastener 14. The tines have a first pair of linear thrust-imparting surfaces 62 which dimensionally and configuratively correspond with surfaces 46 of fastener 14. In addition, the tines 52 ad 54 have a second pair of nonlinear, thrust-impairing surfaces 64 which dimensionally and configuratively correspond with surfaces 48.

Tool 50 fully bottoms in surfaces 46, surfaces 62 thereof fully engaging therewith, and surfaces 64 and 48 also manifest a nesting engagement. The lateral torquing surfaces 66 of tines 52 and 54, there being four thereof, can fully torquingly engage the surface areas, the entire available wall areas of the slotting of fastener 14.

It is a teaching of my invention to provision tines 52 and 54 with inwardly-facing, i.e., mutually-facing, surfaces 68 which, as is especially evidenced in FIG. 4, have an arcuate configuration. The radius of surfaces 68, and of course the diameter defined therebetween thereby, corresponds with the radius and diameter of the surface of the threaded portion of screw 12. Therefore, surfaces 68 positively position-orient the tool 50 relative to the screw 12, fastener 14, and the slotting of the latter. Sidewise slip of the tool 50, relative to the slotting of the fastener 14 is virtually eliminated by the slip engagement of surfaces 68 with screw 12.

Frequently fasteners are provisioned in which the slotting extends linearly and fully across the head thereof, the walled periphery of the head being disrupted by the slotting purposely by design. My tool is no less useful in torquing such fasteners. Very simply, a tool according to my invention, having thrust-imparting surfaces 62 which correspond with the overall slotting length is used. The angular, nonlinear surfaces 64 of the tines 52 and 54 of my tool just would extend freely therefrom, having no application with a fastener of this type.

It is evident that I prescribe no particular dimensions for my tool 50; my tool, of course, is to be provisioned in any plurality of dimensions—with respect to the dimensions of tine length, the extent of surfaces 62 and 64, the width of the tines, the radius of surfaces 68, and the length of the shank 58. My tool is limited to no given dimensions; rather sets of tools 50 of differing, albeit presumably standard, dimensions are proposed to be provisioned for applications with slotted-drive fasteners of such differing dimensions.

In the FIGS. I have illustrated a bifurcated tool 50. Clearly, the spirit of my invention comprehends tools configured in accordance with the teaching of my disclosure which have any plurality of tines. Therefore, while I have described my invention in connection with a specific embodiment thereof, it is to be clearly understood that this is done only by way of example and not as a limitation to the scope of my invention as set forth in the objects thereof and in the appended claims.

I claim:

1. A tool, for torquing a threaded fastener having a drive slot interrupted by a borehole, said slot having a plurality of thrust-receiving bearing surfaces, comprising:

pluralities of means for matingly engaging said bearing surfaces;

shank means for receiving torque and for imparting same to said pluralities; and means unitizingly coupling said shank means and said pluralities; wherein said pluralities of means comprise at least a pair of longitudinally-extending tines, said tines having a plurality of linear, fastener-engaging surfaces, and a plurality of nonlinear, fastener-engaging surfaces, at least one plurality of said fastener-engaging surfaces having configurative and dimensional correspondence with said bearing surfaces;

each of said tines has a surface extending along the longitudinal axis thereof for position-orienting said tool relative to said borehole upon said borehole having an element in penetration thereof; and said axial, position-orienting surface is of arcuate configuration in cross section.

2. The invention, according to claim 1, wherein:
said tines are juxtapositioned in a given plane.

3. The invention, according to claim 1, wherein:
said tines together have not less than two pair of nonlinear, fastener-engaging, terminal surfaces for imparting thrust to said thrust-receiving bearing surfaces, and not less than two pair of other surfaces for imparting torque to upstanding walls of said slot.

4. The invention, according to claim 1, wherein:
all said fastener-engaging surfaces have configurative and dimensional correspondence with said bearing surfaces; and said shank means comprise a shank having a plurality of rectilinear lateral surfaces for coupling engagement with a mechanically-advantaged torquing source.